United States Patent
LeCrone et al.

(10) Patent No.: US 11,546,274 B2
(45) Date of Patent: Jan. 3, 2023

(54) ENCAPSULATED FICON COMMUNICATION

(71) Applicant: EMC IP Holding Company LLC, Hopkinton, MA (US)

(72) Inventors: Douglas E. LeCrone, Hopkinton, MA (US); Jeffrey L. Jones, Fort Lauderdale, FL (US)

(73) Assignee: EMC IP Holding Company LLC, Hopkinton, MA (US)

(*) Notice: Subject to any disclaimer, the term of this patent is extended or adjusted under 35 U.S.C. 154(b) by 217 days.

(21) Appl. No.: 16/885,811

(22) Filed: May 28, 2020

(65) Prior Publication Data
US 2021/0377187 A1 Dec. 2, 2021

(51) Int. Cl.
*H04L 29/06* (2006.01)
*H04L 49/356* (2022.01)
*H04L 69/16* (2022.01)
*G06F 3/06* (2006.01)
*G06F 9/455* (2018.01)

(52) U.S. Cl.
CPC .......... *H04L 49/357* (2013.01); *G06F 3/0604* (2013.01); *G06F 3/067* (2013.01); *G06F 3/0664* (2013.01); *G06F 9/455* (2013.01); *H04L 69/16* (2013.01)

(58) Field of Classification Search
CPC .... G06F 3/0604; G06F 3/0626; G06F 3/0661; G06F 3/0664; G06F 3/067; G06F 3/0671; G06F 9/455; H04L 49/357; H04L 69/16
USPC ........................................................ 370/329
See application file for complete search history.

(56) References Cited

U.S. PATENT DOCUMENTS

| | | | |
|---|---|---|---|
| 7,702,762 B1* | 4/2010 | Jagana | H04L 69/163 370/466 |
| 8,369,347 B2* | 2/2013 | Xiong | H04L 49/357 709/236 |
| 8,514,856 B1* | 8/2013 | Gai | H04L 49/602 726/1 |
| 8,898,444 B1 | 11/2014 | LeCrone et al. | |
| 8,948,176 B1* | 2/2015 | Desanti | H04L 45/74 370/392 |
| 9,942,144 B1* | 4/2018 | Ramalingam | H04L 45/745 |
| 10,129,162 B1* | 11/2018 | Faulk, Jr. | H04L 47/33 |
| 2006/0092943 A1* | 5/2006 | Sundaram | H04L 47/10 370/419 |

(Continued)

*Primary Examiner* — Robert J Lopata
(74) *Attorney, Agent, or Firm* — Muirhead and Saturnelli, LLC

(57) ABSTRACT

Using an alternative communication protocol between a first system and a second system that are otherwise configured to communicate using a FICON protocol includes the first system determining if the alternative communication protocol is handled by the second system, the first system providing encapsulated data by encapsulating FICON data if the alternative communication protocol is handled at the second system, and the first system transmitting the encapsulated data directly to the second system using the alternative communication protocol if the alternative communication protocol is handled at the second system. The alternative communication protocol may be TCP/IP. At least one of the systems is a host computing system, an array storage system, and/or a tape emulation system. At least one of the systems may be a simulation of a host computing system, an array storage system, and/or a tape emulation system.

20 Claims, 4 Drawing Sheets

(56) References Cited

U.S. PATENT DOCUMENTS

| | | | | |
|---|---|---|---|---|
| 2006/0159112 | A1* | 7/2006 | Sundaram | H04L 47/283 370/516 |
| 2008/0056307 | A1* | 3/2008 | DeCusatis | H04L 69/28 370/503 |
| 2012/0254452 | A1* | 10/2012 | Dickens | H04L 67/141 709/228 |
| 2014/0359185 | A1* | 12/2014 | Sawal | G06F 13/26 710/264 |
| 2015/0172122 | A1* | 6/2015 | DeCusatis | H04L 41/0668 370/228 |
| 2018/0331977 | A1* | 11/2018 | Krishnasamy | H04L 49/351 |

* cited by examiner

ENCAPSULATED FICON COMMUNICATION

TECHNICAL FIELD

This application relates to the field of computer systems and storage system therefor and, more particularly, to the field of storage access and I/O operations among computing systems and storage system.

BACKGROUND OF THE INVENTION

Host processor systems may store and retrieve data using a storage system containing a plurality of host interface units (I/O modules), disk drives, and disk interface units (disk adapters). The host systems access the storage systems through a plurality of channels provided therewith. Host systems provide data and access control information through the channels to the storage system and the storage system provides data to the host systems also through the channels. The host systems do not address the disk drives of the storage system directly, but rather, access what appears to the host systems as a plurality of logical disk units. The logical disk units may or may not correspond to any one of the actual disk drives. Allowing multiple host systems to access the single storage system allows the host systems to share data stored therein.

Communication between a host processor system and a storage system may be performed using conventional protocols and connections, such as FICON and the zHPF protocol, to exchange data and status information between the host processor system and the storage system. However, in some instances, a FICON communication connection may not be feasible or desirable. For example, it may be more convenient to provide TCP/IP connections when a host simulator and/or a storage system simulator is being used. Note also that, in many instances, FICON communication may not be not available while TCP/IP communication is available. For example, connections to publicly available cloud storage use TCP/IP, not FICON.

Of course, it is possible to revise and adapt existing storage and host systems to transition from FICON to TCP/IP. However, this may not be possible in instances where systems are closed to third party development. Moreover, even in systems that are not closed, the significant development that would be required may be daunting. U.S. Pat. No. 8,898,444 describes an arrangement where a first computing system may access a storage device on a second computing system where instructions are encapsulated and then transmitted via the Internet over a network. However, that arrangement requires the second computing system that is coupled to both the network and the storage system. The second computing system receives the network I/O and then essentially performs the I/O operation to the storage device on behalf of the first computing system. The need for the second computing system adds complexity and delay that would not be present of a direct connection were possible between the first computing system and the storage device.

Accordingly, it is desirable to provide a mechanism that allows direct connections between devices that are otherwise configured to communicate using FICON protocols where the connections use alternative communication mechanisms, such as TCP/IP.

SUMMARY OF THE INVENTION

According to the system described herein, using an alternative communication protocol between a first system and a second system that are otherwise configured to communicate using a FICON protocol includes the first system determining if the alternative communication protocol is handled by the second system, the first system providing encapsulated data by encapsulating FICON data if the alternative communication protocol is handled at the second system, and the first system transmitting the encapsulated data directly to the second system using the alternative communication protocol if the alternative communication protocol is handled at the second system. The alternative communication protocol may be TCP/IP. At least one of the systems is a host computing system, an array storage system, and/or a tape emulation system. The host system may be an IBM System Z mainframe or a Unisys Dorado system. At least one of the systems may be a simulation of a host computing system, an array storage system, and/or a tape emulation system. The second system may unencapsulate the encapsulated data to provide the FICON data. The second system may inject the FICON data into a driver of the second system. The FICON data that is injected into the driver of the second system may be processed identically to FICON data that is received directly by the second system. The encapsulated data may be unchanged prior to encapsulation. The FICON protocol may be the zHPF protocol.

According further to the system described herein, a non-transitory computer readable medium contains software that uses an alternative communication protocol between a first system and a second system that are otherwise configured to communicate using a FICON protocol. The software includes executable code at the first system that determines if the alternative communication protocol is handled by the second system, executable code at the first system that provides encapsulated data by encapsulating FICON data if the alternative communication protocol is handled at the second system, and executable code at the first system that transmits the encapsulated data directly to the second system using the alternative communication protocol if the alternative communication protocol is handled at the second system. The alternative communication protocol may be TCP/IP. At least one of the systems is a host computing system, an array storage system, and/or a tape emulation system. The host system may be an IBM System Z mainframe or a Unisys Dorado system. At least one of the systems may be a simulation of a host computing system, an array storage system, and/or a tape emulation system. The second system may unencapsulate the encapsulated data to provide the FICON data. The second system may inject the FICON data into a driver of the second system. The FICON data that is injected into the driver of the second system may be processed identically to FICON data that is received directly by the second system. The encapsulated data may be unchanged prior to encapsulation. The FICON protocol may be the zHPF protocol.

BRIEF DESCRIPTION OF THE DRAWINGS

Embodiments of the system are described with reference to the several figures of the drawings, noted as follows.

DETAILED DESCRIPTION OF VARIOUS EMBODIMENTS

The system described herein provides a mechanism that allows using an alternative communication protocol, such as TCP/IP, between systems that are otherwise configured to communicate using a FICON protocol. FICON data is encapsulated prior to being transmitted using the alternative protocol.

Figure 1:
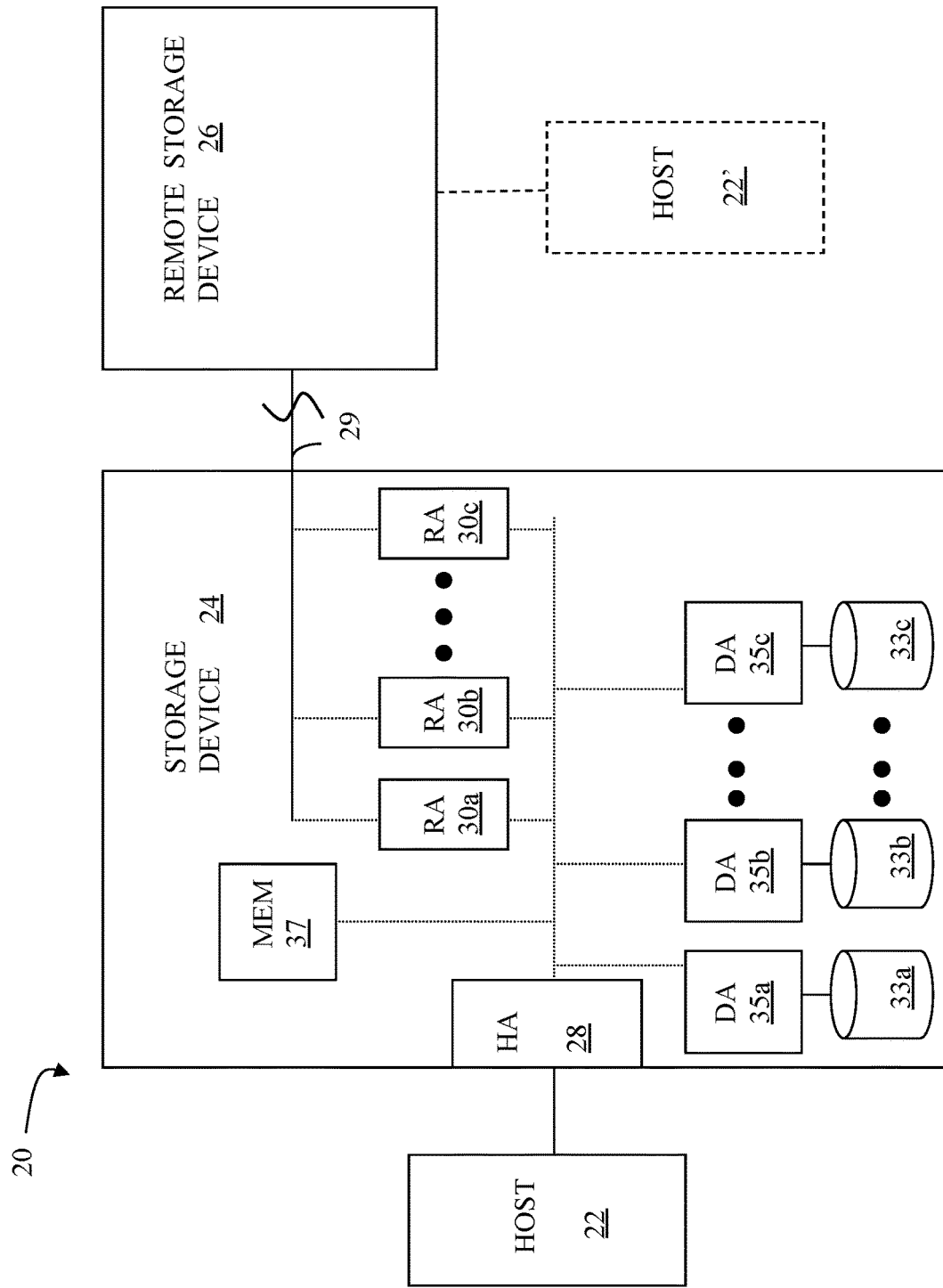
FIG. 1 is a schematic illustration showing a relationship between a host and a storage system that may be used in connection with an embodiment of the system described herein.

FIG. 1 is a diagram 20 showing a relationship between a host 22 and a storage system 24 that may be used in connection with an embodiment of the system described herein. In an embodiment, the storage system 24 may be a PowerMax, Symmetrix, or VMAX storage system produced by Dell EMC of Hopkinton, Mass.; however, the system described herein may operate with other appropriate types of storage systems. Also illustrated is another (remote) storage system 26 that may be similar to, or different from, the storage system 24 and may, in various embodiments, be coupled to the storage system 24, using, for example, a network, such as the Internet. The host 22 reads and writes data from and to the storage system 24 via an HA 28 (host adapter), which facilitates an interface between the host 22 and the storage system 24. Although the diagram 20 shows the host 22 and the HA 28, it will be appreciated by one of ordinary skill in the art that multiple host adaptors connections (possibly of different configurations) may be used and that one or more HAs may have one or more hosts coupled thereto.

In an embodiment of the system described herein, in various operations and scenarios, data from the storage system 24 may be copied to the remote storage system 26 via a link 29. For example, transferring data may be part of a data mirroring or replication process that causes data on the remote storage system 26 to be identical to the data on the storage system 24. Although only the one link 29 is shown, it is possible to have additional links between the storage systems 24, 26 and to have links between one or both of the storage systems 24, 26 and other storage systems (not shown). The storage system 24 may include a first plurality of remote adapter units (RA's) 30a, 30b, 30c. The RA's 30a-30c may be coupled to the link 29 and be similar to the HA 28, but are used to transfer data between the storage systems 24, 26.

The storage system 24 may include one or more physical storage units 33a-33c. The physical storage units may be disks, solid state storage devices, etc., each containing a different portion of data stored on the storage system 24. The storage system 24 (and/or the remote storage system 26) may be provided as a stand-alone device coupled to the host 22 as shown in FIG. 1 or, alternatively, the storage system 24 (and/or remote storage system 26) may be part of a storage area network (SAN) that includes a plurality of other storage systems as well as routers, network connections, etc. (not shown in FIG. 1). The storage systems may be coupled to a SAN fabric and/or be part of a SAN fabric. The system described herein may be implemented using software, hardware, and/or a combination of software and hardware where software may be stored in a computer readable medium and executed by one or more processors.

Each of the physical storage units 33a-33c may be coupled to a corresponding disk adapter unit (DA) 35a-35c that provides data to a corresponding one of the physical storage units 33a-33c and receives data from a corresponding one of the physical storage units 33a-33c. An internal data path exists between the DA's 35a-35c, the HA 28, and the RA's 30a-30c of the storage system 24. Note that, in other embodiments, it is possible for more than one physical storage unit to be serviced by a single DA and that it is possible for more than one DA to service a single physical storage unit. The storage system 24 may also include a global memory 37 that may be used to facilitate data transferred between the DA's 35a-35c, the HA 28, and the RA's 30a-30c as well as facilitate other operations. The memory 37 may contain task indicators that indicate tasks to be performed by one or more of the DA's 35a-35c, the HA 28, and/or the RA's 30a-30c, and may contain a cache for data fetched from one or more of the physical storage units 33a-33c.

The storage space in the storage system 24 that corresponds to the physical storage units 33a-33c may be subdivided into a plurality of volumes or logical devices. The logical devices may or may not correspond to the storage space of the physical storage units 33a-33c. Thus, for example, the physical storage unit 33a may contain a plurality of logical devices or, alternatively, a single logical device could span both of the physical storage units 33a, 33b. Similarly, the storage space for the remote storage system 26 may be subdivided into a plurality of volumes or logical devices, where each of the logical devices may or may not correspond to one or more physical storage units of the remote storage system 26.

In some embodiments, an other host 22' may be provided. The other host 22' is coupled to the remote storage system 26 and may be used for disaster recovery so that, upon failure at a site containing the host 22 and the storage system 24, operation may resume at a remote site containing the remote storage system 26 and the other host 22'. In some cases, the host 22 may be directly coupled to the remote storage system 26, thus protecting from failure of the storage system 24 without necessarily protecting from failure of the host 22.

Figure 2:
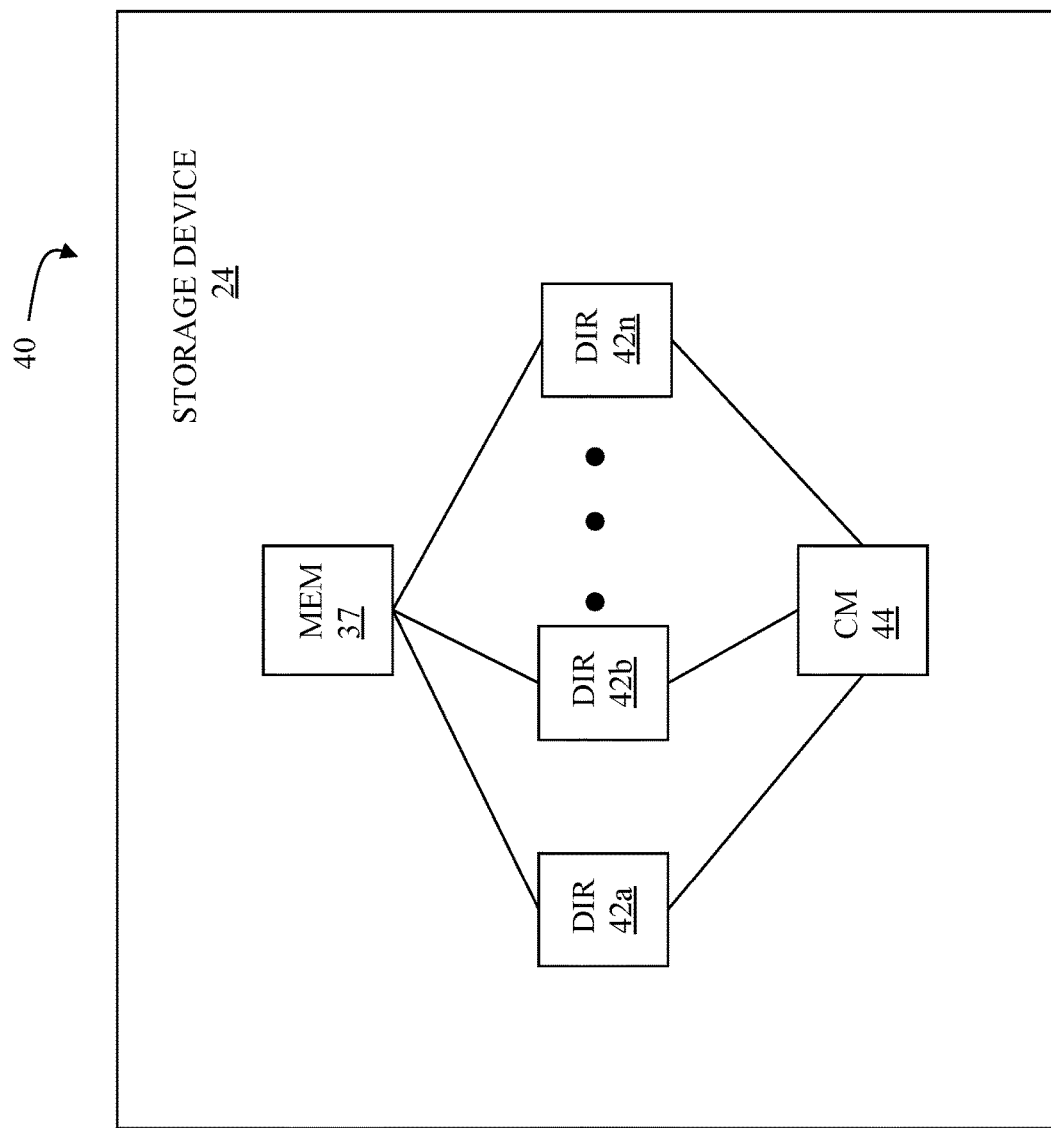
FIG. 2 is a schematic diagram illustrating an embodiment of a storage system where each of a plurality of directors are coupled to the memory according to an embodiment of the system described herein.

FIG. 2 is a schematic diagram 40 illustrating an embodiment of the storage system 24 where each of a plurality of directors 42a-42n are coupled to the memory 37. Each of the directors 42a-42n represents at least one of the HA 28, the RAs 30a-30c, or the DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 37. The CM 44 may be implemented using conventional MUX/router technology where one of the directors 42a-42n that is sending data provides an appropriate address to cause a message and/or data to be received by an intended one of the directors 42a-42n that is receiving the data. Some or all of the functionality of the CM 44 may be implemented using one or more of the directors 42a-42n so that, for example, the directors 42a-42n may be interconnected directly with the interconnection functionality being provided on each of the directors 42a-42n. In addition, one or more of the directors 42a-42n may be able to broadcast a message to all or at least some plurality of the other directors 42a-42n at the same time.

In some embodiments, one or more of the directors 42a-42n may have multiple processor systems thereon and thus may be able to perform functions for multiple discrete directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage system 24 may be provided as one or more director boards having CPUs, memory (e.g., DRAM, etc.) and interfaces with Input/Output (I/O) modules.

Note that, although specific storage system configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host systems with one or more storage systems in a manner that allows reconfiguring connections without having to physically disconnect and reconnect cables from and to ports of the devices. A storage area network may be implemented using one or more switches to which the storage systems and the host systems are coupled. The switches may be programmed to allow connections between specific ports of devices coupled to the switches. A port that can initiate a data-path connection may be called an "initiator" port while the other port may be deemed a "target" port.

Figure 3:
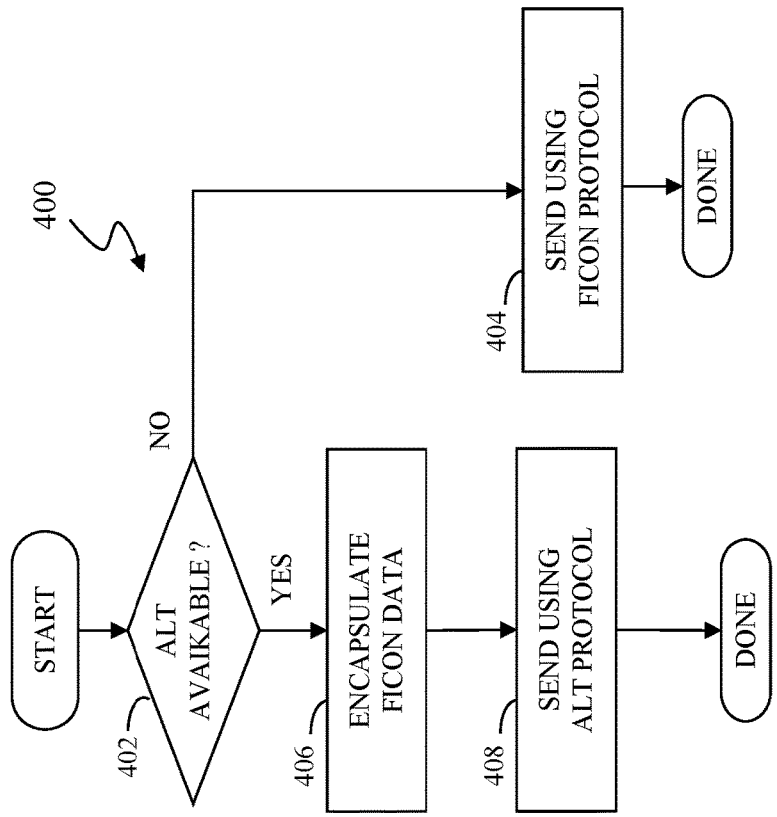
FIG. 3 is a schematic illustration showing software layers in a host according to an embodiment of the system described herein.

Referring to FIG. 3, the host 22 is shown in more detail to include software 200 having an application(s) layer 202, an access methods layer 204, a drivers layer 206, an SSCH layer 208, and a channel subsystem layer 212. The application(s) layer 202 includes one or more software applications that run on the host 22. The access methods layer 204 includes I/O routines (e.g., read, write, open, etc.) that are used by applications in the application(s) layer 202 in connection with performing I/O operations. Software in the application(s) layer 202 calls specific routines in the access methods layer 204 to access data on a storage system coupled to the host.

The I/O routines in the access methods layer 204 call driver routines in the drivers layer 206 that perform lower-level device specific operations that depend upon the specific type of I/O device and the type of connection thereto. For example, a first driver for a Symmetrix storage system coupled to the host 22 by a FICON connection may be different than a second driver used for a different type of non-volatile storage system coupled to the host 22 using a different type of connection. Note, however, that an application in the application layer 202 may call the same routine (e.g., read) in the access layer 204 irrespective of the physical hardware (and connection there) used for the data, but that the routine in the access layer 204 that is called may call different routines in the SSCH layer 208, depending upon a specific configuration/hardware of the system.

The SSCH layer 208 includes routines that perform low-level operations that make calls to the channel subsystem layer 212 for I/O operations that use the channel subsystem 212. The SSCH layer 208 directly controls the hardware used for channel I/O operations, including any storage systems and channels used from transferring data between the host 22 and the storage systems. Routines in the drivers layer 206 call routines in the SSCH layer 208 to perform hardware operations and to transfer data to and from the host 22 and to exchange status and control information to facilitate control of the I/O hardware. In some cases, software in the drivers layer 206 may make calls to directly transfer data between the host 22 and the storage system 24.

It is possible to modify the drivers layer 206 and/or the SCCH layer 208 to allow communication by the host 22 (e.g., communication between the host 22 and the storage system 24) to use a protocol other than FICON. For example, the drivers layer 206 and/or the SCCH layer 208 may be modified to provide TCP/IP communications between the host 22 and the storage system 24. Applications in the applications layer 202 do not need to be modified and may continue to make the same calls to the access methods layer 204 (e.g., read, write, etc.) irrespective of whether the driver layer 206 ultimately directs I/O operations to be performed using a protocol other than FICON. Thus, applications on the host 22 exchange data between the host 22 and the storage system 24 independently from any connection protocol. Note that, in some cases, such as cases involving closed systems, it may be desirable to make modifications at the SCCH layer 208 in order to adapt the host 22 to use a different communication protocol. In other instances, it may be more advantageous to make modifications at the drivers layer 206. Generally, the system described herein provides an alternative communication mechanism for systems, such as the host 22, that are otherwise configured to communicate using FICON protocols.

Figure 4:
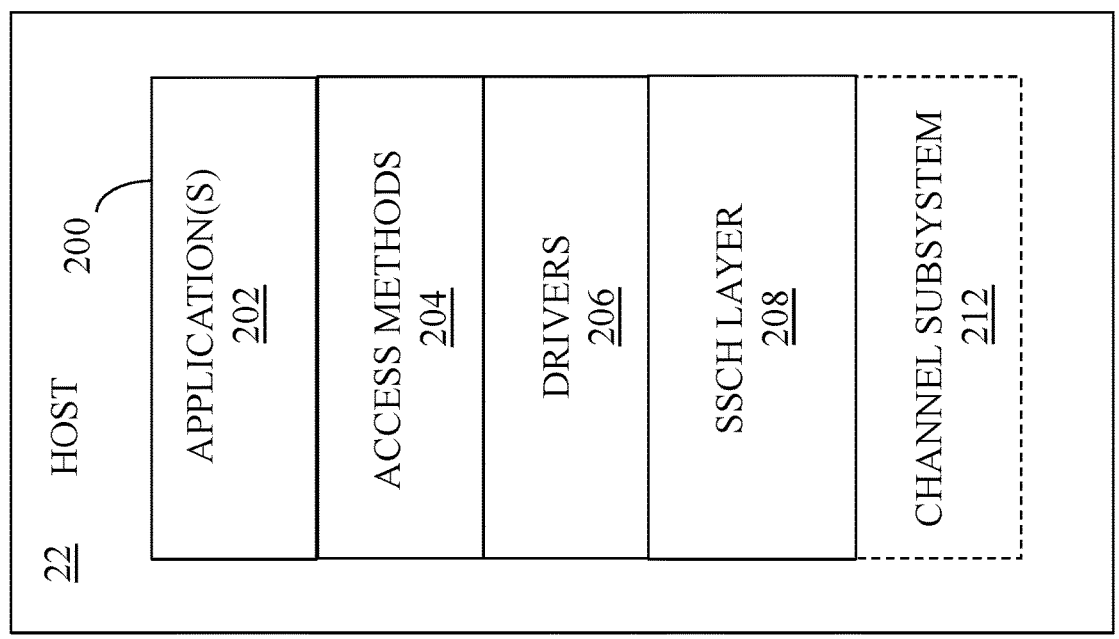
FIG. 4 is a flow diagram illustrating processing performed in connection with encapsulating FICON data prior to transmission according to an embodiment of the system described herein.

Referring to FIG. 4, a flow diagram 400 illustrates processing performed at the drivers layer 206 or at the SSCH layer 208 in connection with sending data using a protocol other than FIFON for a system, such as the host 22, that is otherwise configured to communicate using FICON protocols. Processing begins at a first test step 402 where it is determined if an alternative communication protocol is available. The test at the step 402 may include accessing configuration information that had been previously provided and may also include determining if a receiving device/system is capable of receiving FICON data transmitted using an alternative communication protocol. If it is determined at the test step 402 that the host 22 does not support a communication protocol other than FICON (at least for a particular channel being examined) and/or a receiving system does not support a communication protocol other than FICON, then control transfers from the step 402 to a step 404 where the data is transferred conventionally (i.e., using a FICON protocol). Following the step 404, processing is complete. If it is determined at the test step 402 that the host 22 supports an alternative communication protocol (e.g., TCP/IP), then control transfers from the test step 402 to a step 406 where the FICON data encapsulated. In an embodiment herein, the data is unchanged prior to encapsulation so that the encapsulated data is identical to data that would have been transmitted using a FICON protocol. Note that the FICON protocol may be the zHPF protocol. Following the step 406 is a step 408 where the encapsulated data is sent using the alternative protocol, such as TCP/IP. Following the step 408, processing is complete.

In some embodiments, the processing illustrated by the flow diagram 400 may be provided by modifying/replacing components at the drivers layer 206 by, for example, providing a different driver. In other embodiments, where it may not be feasible to revise or replace components at the drivers layer 206, it may still be practical to provide modifications at a lower level, such as at the SSCH layer 208. Of course, any device/system that communicates using FICON may be modified to communicate using an alternative protocol, such as TCP/IP, as described herein. In an embodiment herein, the encapsulated data is not modified and/or examined prior to transmission. As explained in more detail elsewhere herein, the data may be received at the other end, unencapsulated, and then handled by a receiver as if FICON data had been transmitted by the sender.

Figure 5:
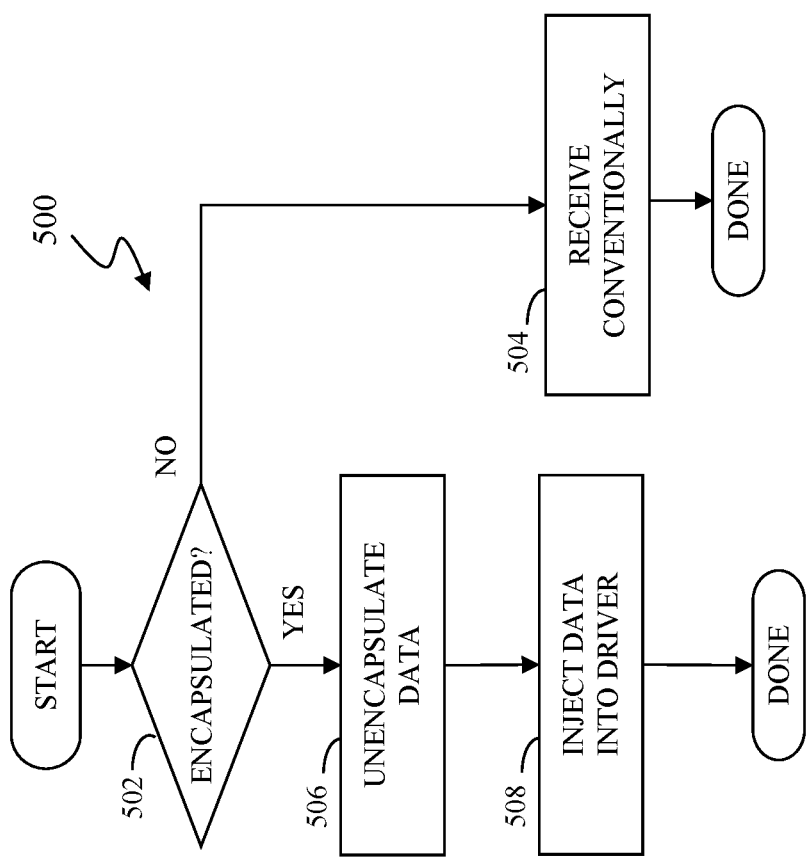
FIG. 5 is a flow diagram illustrating processing performed in connection with receiving encapsulated FICON data according to an embodiment of the system described herein.

Referring to FIG. 5, a flow diagram 500 illustrates in more detail processing performed in connection with receiving FICON data that may have been transmitted using an alternative communication protocol, such as TCP/IP by a system, such as the host 22, that is otherwise configured to communicate using FICON protocols. Processing begins at a first test step 502 where it is determined if the received data has been encapsulated. If not, then control transfers from the test step 502 to a step 504 where the data is received conventionally (i.e., using FICON). Following the step 504, processing is complete. If it is determined at the test step 502 that encapsulated data has been received, then control transfers from the test step 502 to a step 506 where the received data is unencapsulated. Following the step 506 is a step 508 where the received data is injected into a driver (e.g., at the drivers layer 206) so that the data is handled by a receiving system as if the data had been received via FICON communication. That is, the injected FICON data is handled identically to FICON data that is received directly (i.e., data that has not been encapsulated). Following the step 508, processing is complete.

Note that the processing similar to that illustrated in connection with the flow diagram 400 of FIG. 4 and the flow diagram 500 of FIG. 5 for the host 22 may be performed by the storage system 24 (and by the storage system 26). Thus, for example, the host 22 and the storage system 24 may be directly connected using the Internet while, internally, both the host 22 and the storage system 24 may continue to handle transmitted and received data as if FICON communication was being provided between the host 22 and the storage system 24. As discussed elsewhere herein, the transmitted FICON data is not modified prior to encapsulation so that, at a receiver, the unencapsulated data is identical to data that would have been received had no encapsulation or alternative data transmission ever been provided. The system described herein may be adapted to any of a number of uses. For example, a host, such as a Unisys Dorado mainframe or an IBM System Z mainframe or a DLm tape emulation system provided by Dell EMC of Hopkinton Mass. may be configured to communicate using TCP/IP even though being otherwise configured to use FICON protocols. Note also that a host emulation or simulation system may also be configured to communicate with a storage system, a tape emulation system and/or a storage system emulation. The alternative communication may be bi-directional so, for example, a first system communicates with a second system using TCP/IP and the second system communicates with the first system using TCP/IP where the first and second systems are otherwise configured to communicate using FICON.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of using an alternative communication protocol between a host system and an other system that are otherwise configured to communicate using an ANSI FC-SB-3 Single-Byte Command Code Sets-3 Mapping Protocol for Fibre Channel protocol, comprising:
   the host system determining if the alternative communication protocol is handled by the other system by determining if the other system is capable of receiving alternative communication protocol data generated internally by drivers of the host system;
   the host system providing encapsulated data by encapsulating ANSI FC-SB-3 Single-Byte Command Code Sets-3 Mapping Protocol for Fibre Channel protocol data using the drivers that are internal to the host system if the alternative communication protocol is handled at the other system; and
   the host system transmitting the encapsulated data directly to the other system using the alternative communication protocol if the alternative communication protocol is handled at the other system, wherein the encapsulated data received by the other system is the encapsulated data generated internally by drivers of the host system.

2. The method, according to claim 1, wherein the alternative communication protocol is TCP/IP.

3. The method, according to claim 1, wherein the other system is one of: a host computing system, an array storage system, and a tape emulation system.

4. The method, according to claim 3, wherein the host system is one of: an IBM System Z mainframe or a Unisys Dorado system.

5. The method, according to claim 1, wherein the other system is a simulation of one of: a host computing system, an array storage system, and a tape emulation system.

6. The method, according to claim 1, wherein the other system unencapsulates the encapsulated data to provide the ANSI FC-SB-3 Single-Byte Command Code Sets-3 Mapping Protocol for Fibre Channel protocol data.

7. The method, according to claim 6, wherein the other system handles the ANSI FC-SB-3 Single-Byte Command Code Sets-3 Mapping Protocol for Fibre Channel protocol data using a driver of the other system.

8. The method, according to claim 7, wherein the ANSI FC-SB-3 Single-Byte Command Code Sets-3 Mapping Protocol for Fibre Channel protocol data that is handled using the driver of the other system is processed identically to ANSI FC-SB-3 Single-Byte Command Code Sets-3 Mapping Protocol for Fibre Channel protocol data that is received directly by the other system.

9. The method, according to claim 1, wherein the encapsulated data is unchanged prior to encapsulation.

10. The method, according to claim 1, wherein the ANSI FC-SB-3 Single-Byte Command Code Sets-3 Mapping Protocol for Fibre Channel protocol is the zHPF protocol.

11. A non-transitory computer readable medium containing software that uses an alternative communication protocol between a host system and an other system that are otherwise configured to communicate using an ANSI FC-SB-3 Single-Byte Command Code Sets-3 Mapping Protocol for Fibre Channel protocol, the software comprising:
executable code at the host system that determines if the alternative communication protocol is handled by the other system;
executable code at the host system that provides encapsulated data by encapsulating ANSI FC-SB-3 Single-Byte Command Code Sets-3 Mapping Protocol for Fibre Channel protocol data if the alternative communication protocol is handled at the other system; and
executable code at the host system that transmits the encapsulated data directly to the other system using the alternative communication protocol if the alternative communication protocol is handled at the other system, wherein the encapsulated data received by the other system is the encapsulated data generated internally by drivers of the host system.

12. The non-transitory computer readable medium, according to claim 11, wherein the alternative communication protocol is TCP/IP.

13. The non-transitory computer readable medium, according to claim 11, wherein the other system is one of: a host computing system, an array storage system, and a tape emulation system.

14. The non-transitory computer readable medium, according to claim 13, wherein the host system is one of: an IBM System Z mainframe or a Unisys Dorado system.

15. The non-transitory computer readable medium, according to claim 11, wherein the other system is a simulation of one of: a host computing system, an array storage system, and a tape emulation system.

16. The non-transitory computer readable medium, according to claim 11, wherein the other system unencapsulates the encapsulated data to provide the ANSI FC-SB-3 Single-Byte Command Code Sets-3 Mapping Protocol for Fibre Channel protocol data.

17. The non-transitory computer readable medium, according to claim 16, wherein the other system handles the ANSI FC-SB-3 Single-Byte Command Code Sets-3 Mapping Protocol for Fibre Channel protocol data using a driver of the other system.

18. The non-transitory computer readable medium, according to claim 17, wherein the ANSI FC-SB-3 Single-Byte Command Code Sets-3 Mapping Protocol for Fibre Channel protocol data that is handled using the driver of the other system is processed identically to ANSI FC-SB-3 Single-Byte Command Code Sets-3 Mapping Protocol for Fibre Channel protocol data that is received directly by the other system.

19. The non-transitory computer readable medium, according to claim 11, wherein the encapsulated data is unchanged prior to encapsulation.

20. A non-transitory computer readable medium, according to claim 11, wherein the ANSI FC-SB-3 Single-Byte Command Code Sets-3 Mapping Protocol for Fibre Channel protocol is the zHPF protocol.

* * * * *